United States Patent [19]

Loucks et al.

[11] 4,238,580
[45] Dec. 9, 1980

[54] PROCESS OF FORMING URETHANE-COUPLED POLYMERS OF QUINONE-COUPLED POLYPHENYLENE OXIDES

[75] Inventors: George R. Loucks, Scotia; Dwain M. White, Schenectady, both of N.Y.

[73] Assignee: General Electric Company, Schenectady, N.Y.

[21] Appl. No.: 907,589

[22] Filed: May 19, 1978

[51] Int. Cl.³ .............................................. C08G 65/48
[52] U.S. Cl. ....................................... 525/395; 528/79
[58] Field of Search ................ 260/47 ET, 470.2, 874; 528/213, 79; 525/395

[56] References Cited

U.S. PATENT DOCUMENTS

| | | | |
|---|---|---|---|
| 3,375,228 | 3/1968 | Holoch et al. .......................... 260/47 |
| 3,573,254 | 3/1971 | Factor ..................................... 260/47 |
| 3,736,291 | 5/1973 | Vogel .................................. 260/47 R |
| 3,784,575 | 1/1974 | Rutledge .......................... 260/396 R |
| 3,970,640 | 7/1976 | Yonemitsu et al. ............. 260/47 ET |
| 3,987,068 | 10/1976 | Reilly ................................. 260/396 R |

Primary Examiner—Lester L. Lee
Attorney, Agent, or Firm—F. Wesley Turner; James C. Davis, Jr.; Joseph T. Cohen

[57] ABSTRACT

A process of forming linear, branched and/or cross-linked urethane-coupled polymers of quinone-coupled polyphenylene oxides is described which comprises contacting in a high fluid shear stress reaction medium a polyfunctional isocyanate with a quinone-coupled polyphenylene oxide having an average hydroxyl group per molecule value greater than zero including 2.0 or less, and optionally, additionally, a polyphenylene oxide having an average hydroxyl group per molecule value greater than zero including 1.0 or less.

9 Claims, No Drawings

PROCESS OF FORMING URETHANE-COUPLED POLYMERS OF QUINONE-COUPLED POLYPHENYLENE OXIDES

CROSS REFERENCE TO RELATED APPLICATIONS

This invention is related to subject matter disclosed in copending U.S. applications Ser. Nos. 800,635, 800,641, now U.S. Pat. No. 4,156,699, 800,644, now U.S. Pat. No. 4,165,422, 800,645, now U.S. Pat. No. 4,156,773, 800,646, now U.S. Pat. No. 4,140,675, 800,647, now U.S. Pat. No. 4,154,771, 800,648, now U.S. Pat. No. 4,156,772, 800,656, now U.S. Pat. No. 4,156,770, filed May 26, 1977 respectively, and Ser. Nos. 807,990, now U.S. Pat. No. 4,156,771, 808,021, now U.S. Pat. No. 4,158,728, both filed June 20, 1977. All of the aforesaid applications are assigned to the assignee of this application, and all of the subject matter disclosed and referenced therein is incorporated herein in its entirety by reference.

BACKGROUND OF THE INVENTION

1. Field of the Invention

This invention relates to a process of forming linear, branched, and/or cross-linked urethane-coupled polymers of quinone-coupled polyphenylene oxides which comprises contacting in a high fluid shear stress reaction medium a polyfunctional isocyanate with quinone-coupled polyphenylene oxide having an average hydroxyl group per molecule value greater than zero including 2.0 or less, and optionally, additionally, a polyphenylene oxide having an average hydroxyl group per molecule value greater than zero including 1.0 or less.

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879; 3,914,266; 4,028,341, a continuation-in-part of Ser. No. 441,295, filed Feb. 11, 1974, now abandoned; and Olander's U.S. Pat. Nos. 3,956,442; 3,965,069; 3,972,851 and 4,054,553.

Block polymers of prior art polyphenylene oxides employing simple bifunctional coupling compounds such as diacyl halides, diisocyanates, bis(haloaryl)sulfones, etc., are described in White's U.S. Pat. Nos. 3,793,564; 3,770,850; 3,809,729 and 3,875,256.

DESCRIPTION OF THE INVENTION

This invention embodies a process of forming linear, branched, and/or cross-linked urethane-coupled polymers of quinone-coupled polyphenylene oxides which comprises contacting in a high fluid shear stress reaction medium a polyfunctional isocyanate with a quinone-coupled polyphenylene oxide having an average hydroxyl group per molecule value greater than zero including 2.0 or less, and optionally, additionally, a polyphenylene oxide having an average hydroxyl group per molecule value greater than zero including 1.0 or less.

The quinone-coupled polyphenylene oxides can be prepared by the method of White described in copending U.S. Ser. Nos. 800,635 and 800,646, both filed May 26, 1977. Illustrative quinone-coupled polyphenylene oxides are described by the following formula:

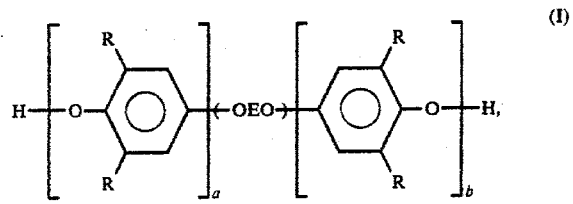

wherein independently each $-\!\!+\!OEO\!+\!\!-$ is a divalent quinone residue, E is a divalent arene radical, either a or b is at least equal to 1, the sum of a plus b is preferably at least equal to 10, more preferably 40 to 170, and R is hydrogen, a hydrocarbon radical, a halohydrocarbon radical, a hydrocarbonoxy radical or a halohydrocarbonoxy radical.

The isocyanates employed can be any polyfunctional isocyanate subject to the proviso that the isocyanate have at least two isocyanate coupling reaction sites. The term "polyfunctional isocyanate" includes any di- or tri-isocyanate illustrated by the formula:

where c is a number at least equal to 2, and $R''$ is $C_{2-8}$ alkylene, e.g., ethylene, propylene, isopropylene, the various isomeric butylenes, the various isomeric pentylenes, the various isomeric hexylenes (including cyclohexylenes) the isomeric heptylenes, the isomeric octylenes, phenylene, biphenylene, i.e.,

e.g., 2,2'-, 2,3'-, 2,4'-, 3,3'-, 3,4'- and 4,4'-biphenylene; bis(phenylene)-$C_{1-8}$ alkane, i.e.,

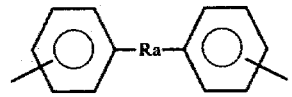

where $R_a$ is $C_{1-8}$ alkylene or alkylidene, e.g., methylene, ethylidene, isopropylidene, butylidene, etc. and the various other examples given above for $R''$; biphenylene oxide, i.e.,

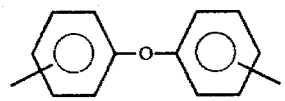

poly ($C_{2-8}$ oxyalkylene), having an average of 2 to 10 repeating units, i.e., $-\!\!+\!R_b\!-\!O\!+\!\!-_p$ where p is 2–10 and $R_b$ is alkylene, examples of which are given above for $R''$, and the above-mentioned groups containing a phenylene or biphenylene group, e.g., the various phenylenes, biphenylenes, bis(phenylene)-$C_{1-8}$ alkanes, and (biphenylene) oxides, wherein, one up to the total number of aromatic hydrogens have been replaced with halogen, preferably chlorine, and/or $C_{1-8}$ groups.

Illustrative of specific examples of a portion of presently preferred polyfunctional isocyanates that can be employed are:
polymethylene diisocyanates, e.g.,
ethylene diisocyanate,
trimethylene diisocyanate,
tetramethylene diisocyanate,
hexamethylene diisocyanate,
octamethylene diisocyanate, etc.;
alkylene diisocyanates e.g.,
propylene-1,2-diisocyanate,
butylene-1,2-diisocyanate,
butylene-1,3-diisocyanate,
butylene-2,3-diisocyanate, etc.;
alkylidene diisocyanates, e.g.,
ethylidene diisocyanate,
propylidene diisocyanate,
isopropylidene diisocyanate, etc.;
cycloalkylene diisocyanates, e.g.,
cyclopentylene-1,3-diisocyanate,
cyclohexylene-1,2-diisocyanate,
cyclohexylene-1,3-diisocyanate,
cyclohexylene-1,4-diisocyanate, etc.;
aromatic diisocyanates, e.g.,
o-phenylene diisocyanate,
m-phenylene diisocyanate,
p-phenylene diisocyanate,
1-chloro-2,4-phenylene diisocyanate,
4-chloro-1,3-phenylene diisocyanate,
4,6-dichloro-1,3-phenylene diisocyanate,
2,4,6-tribromo-1,3-phenylene diisocyanate,
2,4,6-trichloro-1,3-phenylene diisocyanate,
tetrachloro-1,3-phenylene diisocyanate,
meythylene-4,4'-bis(phenyl isocyanate),
2,4-tolylene diisocyanate,
2,6-tolylene diisocyanate,
3,3'-dimethyl-4,4'-biphenylene diisocyanate,
methylene-4,4'-bis(2-methylphenyl isocyanate),
2,2',5,5'-tetramethyl-4,4'-biphenylene diisocyanate,
1-chloro-2,4-phenylene diisocyanate,
4-chloro-1,3-phenylene diisocyanate,
4,6-dichloro-1,3-phenylene diisocyanate,
2,4,6-tribromo-1,3-phenylene diisocyanate,
2,4,6-trichloro-1,3-phenylene diisocyanate,
tetrachloro-1,3-phenylene diisocyanate, etc.

Illustrative of the broad group of urethane-coupled polymers of quinone-coupled polyphenylene oxides that can be prepared according to our process, among others, are those described by the following illustrative linear, branched and cross-linked polymer structures:

| | | BZB, BZA, BZBZ, ZABZA, BZBZB, | | |
|---|---|---|---|---|
| (III linear) | | AZBZBZBZA, etc. | | |
| | | | AZA | |
| | A | B B | B A | B |
| (III branched) | BZB, | BZBZB, | BZBZA, | AZBZBZA, | etc. |
| | | A | A | |
| | A | Z | Z | A |
| (III cross-linked) | BZBZBZB, | AZBZBZB, | AZBZBZBZA, | etc. |
| | B | B | B B | B B |
| | AZBZBZBZA | AZBZBZA | AZBZBZA | |
| | | A | A | | wherein -A represents a monovalent phenoxy residue of a polyphenylene oxide of formula (IV) described hereinafter, —B— represents a divalent phenoxy residue of a quinone-coupled polyphenylene oxide of formula (I) and —Z— or $$-\overset{|}{\underset{|}{Z}}-$$

represents a di- or a tri-valent isocyanate residue of formula (II). The above illustrative linear, branched, cross-linked combinations of monovalent phenoxy radicals, divalent phenoxy radicals, and di- and/or tri-functional isocyanate radicals are not intended to limit the combinations that can be obtained by the practice of this invention since such combinations are limited only by the amounts of the representative precursors of the various radicals charged to the reaction medium in carrying out the process of this invention.

The end capping Polyphenylene oxide precursors of monovalent phenoxy residues represented hereinbefore by A can be described by the following formula:

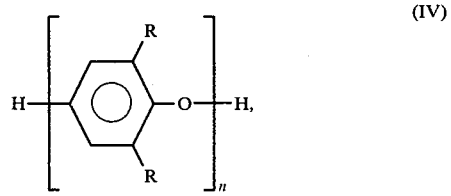

wherein independently each R is as defined hereinbefore and n is a number of at least 10, preferably 40 to 170.

Our process is carried out by introducing a polyfunctional isocyanate, e.g. of formula II, to a solution of a quinone-coupled polyphenylene oxide, e.g. of formula I, and optionally a polyphenylene oxide, e.g. of formula IV, under fluid mixing conditions wherein the solution high fluid shear stress since our process is highly sensitive to the dispersion of the reactants. In a preferred embodiment, the coupling reaction is carried out while introducing an isocyanate to a quinone-coupled polyphenylene oxide solution at a point or region within a reaction environment near a mixing impeller, e.g. an axial-flow or radial flow impeller, such as a marine-type mixing propeller, fan turbine, pitched paddle, curved blade turbine, spiral backswept turbine flat-blade turbine, gate impeller, anchor impeller, etc., in order to establish and maintain high fluid shear rates and accordingly relatedly high fluid shear stresses. The addition of isocyanate under the aforesaid process conditions facilitates the establishment and maintenance of a substantially uniform dispersion of the reactants, e.g. isocyanate, quinone-coupled polyphenylene oxide, water soluble base, and catalytic phase transfer agent, and accordingly optimum process efficiency. In general, process equipment employing high-speed axial-flow impeller mixers are presently preferred in our process.

Advantageously and preferably, our process can be carried out employing substantially the exact stoichiometric amounts of polyfunctional isocyanate required to completely couple essentially all of the quinone-coupled polyphenylene oxide reactant while obtaining optimum increases in the urethane-coupled quinone-coupled polyphenylene oxide intrinsic viscosity. Preferably the isocyanate is added to the reaction medium continuously during the course of the reaction so that the exact stoichiometric polyfunctional isocyanate requirements for completion of the coupling reaction are only satisfied as the last portion of isocyanate is added to the reaction medium.

In a preferred embodiment, our process is carried out in the substantial absence of any hydrolyzing agent, e.g. water methanol, etc., or other chemical constituents which can promote undesirable side reactions, such as primary or secondary amines. Accordingly, it is highly desirable that the individual and preferably the collective water, methanol, etc., primary and secondary amine content be limited to less than 1%, and more preferably less than ½% based on the weight of quinone-coupled polyphenylene oxide reactant.

The isocyanate coupling reaction is carried out in the presence of water soluble base, preferably in solution in an aqueous phase. The water soluble base can be any water soluble base which, in the presence of polyphenylene oxides, can convert substantially all of the hydroxy groups associated therewith to phenoxides, i.e. alkali metal or alkaline earth metal cation phenoxides or "onium" phenoxides derived from catalytic phase transfer agents described in greater detail later herein. Further illustrative of the bases that can be employed are alkali metal or alkaline earth metal hydroxides and carbonates, e.g. potassium hydroxide, sodium hydroxide, sodium monocarbonate, barium carbonate, etc. In general, any amount of water soluble base can be employed, e.g. 0.1 to about 1000, preferably 1 to about 20, and more preferably 1.5 to about 5 moles of base per hydroxyl group associated with the polymers as identified by hydroxyl group infrared absorption at 3610 cm.$^{-1}$ based on a 2.5% solution in a $CS_2$ over a 1 cm. path calibrated against $CS_2$ in a matched cell. Further, preferably, the water soluble base is employed in solution in an aqueous phase wherein the water soluble base content is at least 10% and more preferably at least 25-50% by weight of the aqueous base solution.

Preferably the isocyanate coupling reaction is carried out in the presence of a catalytic phase transfer agent. The agent can be any phase transfer agent known to those skilled in the art, e.g. quaternary ammonium compounds, quaternary phosphonium, tertiary sulfonium compounds, etc., including mixtures thereof. Presently preferred phase transfer agents can be described by the formulae:

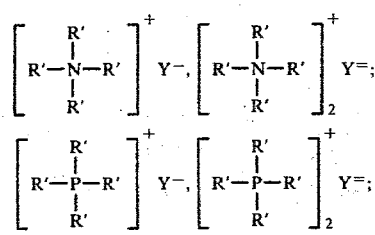

-continued

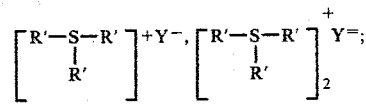

wherein each R' is independently selected from aliphatic hydrocarbon radicals having from about 1 to about 30 carbon atoms, preferably from about 2 to about 15 carbon atoms, each Y$^-$ is selected from the group consisting of Cl$^-$, Br$^-$, F$^-$, $CH_3SO_3^-$, $CH_3CO_2^-$, $CF_3CO_2^-$ or OH$^-$, and each Y$^=$ is selected from the group consisting of $SO_4^=$, $CO_3^=$, or $C_2O_4^=$. The catalytic phase transfer agents can also be employed in any amount, e.g. in amounts of from 0.001 to 10, preferably from 0.01 to 1.0, and more preferably from 0.05 to 0.5 moles based on the molar amounts of hydroxyl groups associated with the polymer.

Broadly, reaction time can be any time, e.g. 1/10 hour or less, to 10 hours, or more. Broadly, the reaction temperature can be any temperature, e.g. 0° C. or less to 150° C. or more. Broadly, the reaction pressures can be any pressure, e.g. subatmospheric, atmospheric or superatmospheric. Preferably, the reaction is carried out under optimum time, temperature and pressure reaction conditions which integrates substantially all, e.g. 90-99% or more of the isocyanate contained within the reaction medium into the polymer backbone during the process. Broadly, the urethane-coupled quinone-coupled polyphenylene oxides can be isolated from the reaction medium by any means employed heretofore to isolate the polymer produced by the processes of Hay and Olander. Preferably, the products are isolated from the reaction medium by spray drying, steam precipitation or any other method which avoids costly distillation procedures involving the separation by distillation of mixed solvents.

In order that those skilled in the art may better understand our invention, the following examples are given which are illustrative of the best mode of practicing the invention:

EXAMPLE I (A) Polymer Preparation, and (B) Catalyst Deactivation

A 2.5 gallon stainless steel reactor equipped with an air-driven paddle stirrer, oxygen inlet tube, and water-cooled coil and jacket was charged with 150 g. 2,6-xylenol, 2.3 liters of toluene, 1.5 g. of Adogen ® 464, i.e. trialkyl ($C_{8-10}$) methyl ammonium chloride, 3.4 g, N,N'-di-t-butylethylenediamine (DBEDA), 47.5 g. dimethyl-n-butylamine (DMBA), and 15 g. di-n-butylamine (DBA), and 4.2 ml. of a catalyst stock solution formed by dissolving 19.30 g. of cuprous oxide in 100 ml. of a chilled 47.2% aqueous hydrobromic acid solution. Oxygen was bubbled through the rewaction medium at a rate of 8.3 moles per hour and the mixture was stirred vigorously. 1350 g. of 2,6-xylenol in 1.5 liters of toluene was pumped into the reactor while the reaction temperature was maintained at 25°±1° C. over a 30-minute period. The temperature was then allowed to rise to 35°±1° C. After the desired reaction product viscosity was obtained the reactor was purged of oxygen by passing nitrogen instead of oxygen through the reaction medium and a 38% aqueous solution of a trisodium salt of EDTA, i.e. ethylenediamine tetraacetic acid, was added to deactivate the catalyst system. Summarily, the reaction parameters relative to molar ratios of 2,6-xylenol:Cu:DBEDA:DMBA:Br:DBA were as follows: 1124:1:1.8:43:3.2:10.5.

Summary of Reaction Parameters and
Properties of Poly (2,6-dimethyl-1,4-phenylene oxide)

| Run No. | TMDQ (%) | React. Temp. (°C.) | React. Time (min.) | [η] (dl./g) | OH Absorbance @ 3610cm$^{-1}$ | GPC $M_w/M_n$ |
|---|---|---|---|---|---|---|
| 1 | 0.91 | 25–35 | 103 | 0.37 | 0.182 | — |

(C) Quinone Coupling

The reaction mixture as described in sections (A) and (B) above with a steady nitrogen sweep was heated to 50° C. and maintained at 50°–55° C. until the deep orange TMDQ color disappeared leaving a very light green solution. Methanol was added to the resulting solution to precipitate the polymer, which was collected on a filter, washed with methanol, and dried in a circulating air oven overnight at 90° C.

Summary of Reaction Parameters and
Properties of
Quinone-Coupled Poly (2,6-dimethyl-1,4-phenylene oxide)

| Run No. | TMDQ (%) | React. Temp. (°C.) | React. Time (min.) | [η] (dl./g) | OH Absorbance @ 3610cm$^{-1}$ | GPC $M_w/M_n$ |
|---|---|---|---|---|---|---|
| 1 | <0.001 | 50–55 | ~90 | 0.31 | 0.301 | 3.43 |

(D) Coupling With Toluene 2,4-Diisocyanate

A solution containing 10 g. of quinone-coupled polyphenylene oxide prepared as in part (C) above and 30 ml. monochlorobenzene was added to a 300 ml. Waring blender, kept under a nitrogen atmosphere and contacted with 0.5% (by weight based on the weight of quinone-coupled polyphenylene oxide) Adogen ® 464 and 1.3 ml. of a 50% aqueous sodium hydroxide solution. The mixture was stirred in the blender at maximum speed (high fluid shear stress reaction conditions) and 0.19 g. of toluene 2,4-diisocyanate was added over a four minute period. Stirring was continued an additional 2–3 minutes. Toluene was added and the polymer was precipitated by acidification with concentrated HCl and the addition of methanol. The polymer was filtered and dried in vacuo at 60° C. overnight.

The intrinsic viscosity of the polymer before coupling was 0.31 dl./g. and after coupling was 0.47 dl./g.

The diisocyanate coupled quinone-coupled polyphenylene oxide phenolic hydroxyl absorbance at 3610 cm.$^{-1}$ (in carbon disulfide) was 0.026 absorbance units for a 2.5% solution in a 1.0 cm. cell.

As illustrated by the foregoing example, polyfunctional isocyanates can be reacted with quinone-coupled polyphenylene oxides under widely varying reaction conditions to form urethanecoupled quinone-coupled polyphenylene oxides. Preferred urethanecoupled polymers prepared in accordance with our process are linear polymers wherein the resulting polyphenylene oxide polymers are essentially linear polymers and more preferably are essentially linear polymers wherein all available hydroxyl components have been end capped so that the hydroxyl content of the resulting polymer is essentially nil.

The urethane-coupled quinone-coupled polyphenylene oxides of our process can have any intrinsic viscosity and any weight average molecular weight $\overline{M}_w$. Presently preferred polymers of our process generally have an $\overline{M}_w$ value of 10,000 to 120,000 more preferably 30,000 to 60,000, having generally corresponding intrinsic viscosities of 0.17 to 1.7, and 0.4 to 0.7, respectively.

The polymers of this invention can be combined with other fillers, modifying agents, etc., such as dyes, pigments, stabilizers, flame retardant additives with beneficial results.

We claim:

1. A process of forming urethane-coupled polymers of a quinone-coupled polyphenylene oxide which comprises contacting in a high fluid stress reaction medium (A) a polyfunctional isocyanate with (B) a quinone-coupled polyphenylene oxide having an average hydroxyl group per molecule value greater than zero including 2.0 or less, and, optionally, a (C) polyphenylene oxide having an average hydroxyl group per molecule value greater than zero including 1.0 or less.

2. The claim 1 process, wherein (A) the polyfunctional isocyanate is of the formula:

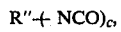

where c is a number at least equal to 2, and R'' is a $C_{2-8}$ alkylene, a phenylene, a biphenylene, a bis(phenylene)-$C_{1-8}$ alkane, or a biphenylene oxide; (B) the quinone-coupled polyphenylene oxide is of the formula:

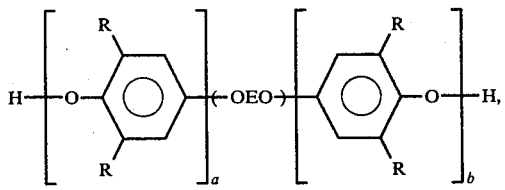

wherein independently each R is hydrogen, a hydrocarbon radical, a halohydrocarbon radical, a hydrocarbonoxy radical or a halohydrocarbonoxy radical, either a or b is at least equal to 1, the sum of a plus b is at least equal to 10, +OEO+ is a divalent quinone residue, and E is a divalent arene radical, and (C) the polyphenylene oxide is of the formula:

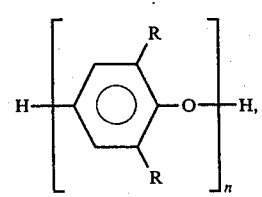

and wherein independently each R is as defined above, and n is a number of at least 10.

3. The claim 2 process, wherein +OEO+ is of the formula:

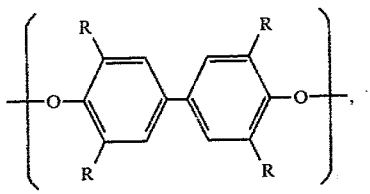

wherein independently each R is as defined hereinbefore.

4. The claim 3 process, wherein the sum of a plus b is 40 to 170.
5. The claim 4 process, wherein each R is hydrogen, a hydrocarbon, or a halohydrocarbon radical.
6. The claim 5 process, wherein each R is a methyl radical.
7. The claim 1 process, carried out in the substantial absence of a hydrolyzing agent.
8. The claim 7 process, carried out in the presence of water soluble base.
9. The claim 8 process, carried out in the presence of a catalytic phase transfer agent.

* * * * *